United States Patent
Yiu et al.

(10) Patent No.: US 9,420,627 B2
(45) Date of Patent: *Aug. 16, 2016

(54) SYSTEMS, METHODS, AND DEVICES WITH DIFFERENT RADIO LINK FAILURE TIMERS BASED ON USER EQUIPMENT SPEED

(71) Applicant: INTEL IP CORPORATION, Santa Clara, CA (US)

(72) Inventors: Candy Yiu, Portland, OR (US); Daniel W. Aley, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/986,245

(22) Filed: Dec. 31, 2015

(65) Prior Publication Data
US 2016/0128134 A1  May 5, 2016

Related U.S. Application Data

(63) Continuation of application No. 14/317,184, filed on Jun. 27, 2014, now Pat. No. 9,258,723.

(60) Provisional application No. 61/883,127, filed on Sep. 26, 2013.

(51) Int. Cl.
    *H04W 36/00*   (2009.01)
    *H04W 76/06*   (2009.01)
    *H04W 36/32*   (2009.01)

(52) U.S. Cl.
    CPC ............ *H04W 76/068* (2013.01); *H04W 36/32* (2013.01)

(58) Field of Classification Search
    USPC .......................................... 455/441
    See application file for complete search history.

(56) References Cited

U.S. PATENT DOCUMENTS

| | | | |
|---|---|---|---|
| 2011/0080825 | A1 | 4/2011 | Dimou et al. |
| 2012/0088498 | A1 | 4/2012 | Xiao et al. |
| 2013/0023302 | A1 | 1/2013 | Sivanesan et al. |
| 2015/0087317 | A1 | 3/2015 | Yiu et al. |

FOREIGN PATENT DOCUMENTS

| | | |
|---|---|---|
| EP | 2613586 A1 | 1/2012 |
| WO | 2013019153 A1 | 2/2013 |

OTHER PUBLICATIONS

PCT/US2014/050731, International Search Report and Written Opinion, Nov. 19, 2014, 7 pages.
U.S. Appl. No. 14/317,184, Notice of Allowance, Oct. 14, 2015, 29 pages.

*Primary Examiner* — Joel Ajayi
(74) *Attorney, Agent, or Firm* — Stoel Rives LLP

(57) ABSTRACT

Systems, methods, and device for adjusting an operation time of a radio link failure timer are disclosed herein. User equipment (UE) may be configured to communicatively couple to an evolved Universal Terrestrial Radio Access Network (E-UTRAN). The UE use different radio link failure timer parameters depending on the speed of the UE. The radio link failure timer may run for a longer time for rapidly moving UEs and run for a shorter time for slowly moving UEs. In an embodiment, the UE may scale the radio link failure timer by a scaling factor. In another embodiment, the UE may include multiple radio link failure timers for different speeds. The radio link failure timer parameters for each speed may be specified by the E-UTRAN in a one-to-one communication. The E-UTRAN may determine which parameters to use for each UE based on characteristics of the UE.

15 Claims, 7 Drawing Sheets

SYSTEMS, METHODS, AND DEVICES WITH DIFFERENT RADIO LINK FAILURE TIMERS BASED ON USER EQUIPMENT SPEED

RELATED APPLICATIONS

This application claims priority to and the benefit of U.S. patent application Ser. No. 14/317,184, filed Jun. 27, 2014, which claims priority to and the benefit of U.S. Provisional Patent Application No. 61/883,127, filed Sep. 26, 2013, both of which are hereby incorporated by reference herein in their entirety.

TECHNICAL FIELD

The present disclosure relates to systems, methods, and devices for providing different radio link failure timers based on the speed of user equipment.

DETAILED DESCRIPTION OF PREFERRED EMBODIMENTS

Figure 1:
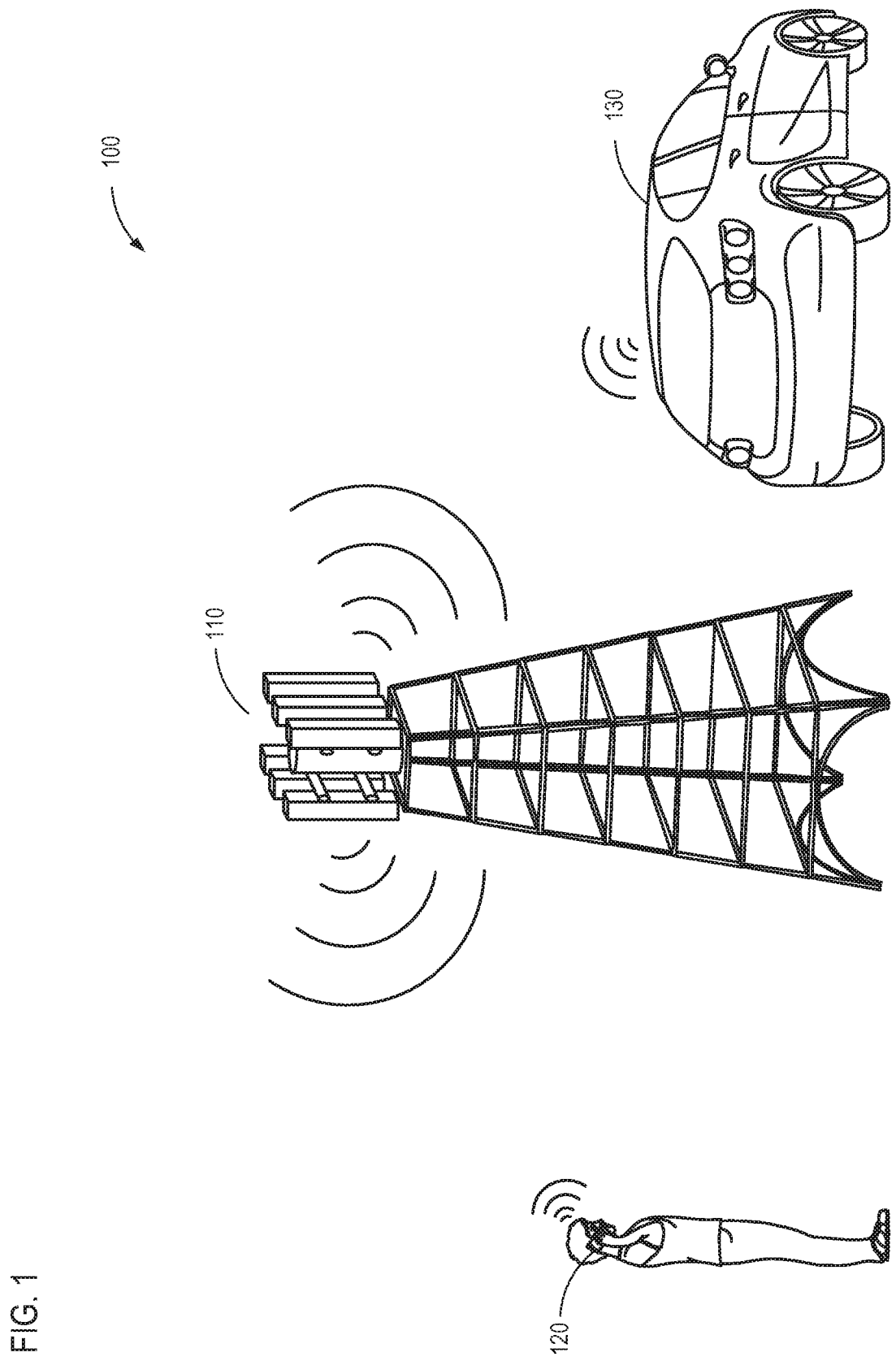
FIG. 1 is a schematic diagram of a system including a plurality of UEs moving at various speeds connected to a radio access network.

Wireless mobile communication technology uses various standards and protocols to transmit data between a base station and a wireless communication device. Wireless communication system standards and protocols can include, for example, the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In 3GPP radio access networks (RANs) in LTE systems, a base station may include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE). An evolved packet core (EPC) may communicatively couple the E-UTRAN to an external network, such as the Internet.

LTE networks include radio access technology and core radio network architecture that provide high data rate, low latency, packet optimization, and improved system capacity and coverage. In LTE networks, an E-UTRAN may include a plurality of eNodeBs and may communicate with a plurality of UEs. UEs may be handed over from one eNodeB to another as the signal strength of the eNodeBs changes (e.g., due to movement by the UEs). A UE may start a radio link failure (RLF) timer (e.g., a T310 timer, a recover timer, or the like) if the signal quality from an eNodeB to which the UE is currently connected falls below a predetermined threshold. For example, if a Channel Quality Indicator (CQI) is less than a threshold Qout, an out-of-sync indication may be generated. If more than a specified number of out-of-sync indications are received, the RLF timer may be started. If the CQI is greater than a threshold Qin more than a specified number of times, the RLF timer may be stopped. If the RLF timer expires, an RLF may be declared. RLFs may occur during handover or when a handover is not occurring but may be more prevalent during handovers. If an RLF is declared, the UE may attempt to establish a connection with an eNodeB that has the UE context and/or may enter an idle mode and restart the connection process a new.

The plurality of UEs may travel at different speeds relative to the eNodeBs. For example, one UE may be carried by a person who is stationary or travelling on foot and another may be carried by a person travelling in a car or a high speed train. The channel conditions experienced by the UEs may be different. The channel condition may change quickly for the rapidly moving UE, and the UE may quickly distance itself from any sources of interference that begin degrading the channel. If given enough time, the UE may be able to recover a radio link with the eNodeB without declaring an RLF. In contrast, the slowly moving UE may be less likely to recover from poor channel conditions. Shadowing and/or a source of interference may degrade performance of the UE for an extended period of time. The UE may receive an improved signal by changing to another eNodeB. Thus, performance of the slowly moving UE may be improved by declaring an RLF sooner and restarting the connection establishment process.

The time until an RLF is declared may be adjusted for each UE to accommodate the different speeds of the various UEs. In some embodiments, the UE determines the speed at which it is moving and adjusts the RLF timer parameters accordingly. The running time of the RLF timer may be increased for rapidly moving UEs, may be decreased for slowly moving UEs, and/or the like. The UE may determine the RLF timer parameters for a plurality of speeds in advance and may select the RLF timer parameters corresponding to a current speed when the RLF timer needs to be started. Alternatively, only the RLF parameters for the current speed may be determined. The UE may be classified into one of a plurality speed states based on the speed of the UE. The speed states may include slow, medium, and/or fast. There may be 2, 3, 4, 5, or more speed states. The speeds corresponding to each speed states may be predefined and/or may be communicated to the UE by the eNodeB.

The UE may adjust the RLF timer parameters by determining which of a plurality of scaling factors should be applied to the RLF timer. A scaling factor that causes the RLF timer to expire sooner or does not change the RLF timer may be used for a slowly moving UE. A scaling factor that does not change the RLF timer or that causes the RLF timer to expire later may be used for a rapidly moving UE. In an embodiment, a scaling factor less than one causes the timer to count up more slowly. The UE may adjust the RLF timer parameters by determining which of a plurality of RLF timers to use to determine when to declare an RLF. The plurality of RLF timers may be configured to run for different lengths of time before expiring. The plurality of RLF timers may all be started and only the RLF timer corresponding to the current UE speed may be evaluated when determining whether to declare an RLF. Alternatively, only the RLF timer corresponding to the current UE speed may be started. In an embodiment, a long RLF timer may be used by a rapidly moving UE, and a short RLF timer may be used by a slowly moving UE.

The UE may receive the RLF timer parameters from an eNodeB. The RLF parameters may include scaling factors to be used for different speed states, a run time of the T310 timer, run times for a plurality of T310 timers (e.g., a long T310 timer and a short T310 timer), cutoffs for speed states, and/or the like. In an embodiment, the eNodeB may determine the speed of the UE and send a T310 timer value determined based on the UE speed to the UE. However, the eNodeB uses a lot of resources (e.g., storage resources, processing resources, communication resources, etc.) determining the speed of all connected UEs, tracking the speed, and sending updates to the T310 timer value. Resources can be saved by determining the UE speed only once, but the UE may use a non-optimal T310 timer value if it changes speed. In another embodiment, the eNodeB may broadcast a high speed timer value and a low speed timer value in a system information block (SIB), and the UE may determine which timer value to use based on its measurements of its own speed. However, there may be a large communication resource penalty when the system information block is made longer. Additionally, the eNodeB may not be able to customize timer parameters to individual UEs.

In an alternate embodiment, the eNodeB may use a radio resource control (RRC) message (e.g., a connection reconfiguration message) to send timer parameters to the UE. For example, a SIB may include default timer parameters that do not account for speed, and the RRC message may further define the timer parameters for different speeds and/or speed states of the UE. The RRC message may be sent after the UE first attaches to the eNodeB. The RRC message may contain sufficient information for the UE to be able to determine which RLF timer parameters to use based on the UE's own determination of its speed. Accordingly, the eNodeB may not need to determine or track UE speed or send multiple RRC messages. The RRC message may be a unicast message sent in a one-to-one communication from the eNodeB to the UE and may only need to be sent once, so few communication resources may be used. In addition, the RLF timer parameters may be customized to the UE. For example, the UE may send indications of characteristics, such as identifying information for the UE, to the eNodeB. The characteristics may include a manufacturer of the UE, a model of the UE, settings of the UE, a manufacturer of a transceiver, a model of the transceiver, settings of the transceiver, an initial speed of the UE when first becoming attached, and/or the like. The eNodeB may determine the RLF timer parameters based on the received indications. The eNodeB may further determine the RLF timer parameters based on its own known characteristics (e.g., whether the eNodeB is urban or rural, the presence of shadowing objects, a number of pico cells or other small cells nearby, a number of UEs typically present, etc.). The eNodeB may attempt to optimize the RLF timer based on the expected performance of the UE under expected conditions for the different speeds.

FIG. 1 is a schematic diagram of a system 100 comprising a plurality of UEs 120, 130 communicatively coupled to an eNodeB 110. The UEs 120, 130 may be moving at different speeds relative to the eNodeB 110. For example, a first UE 120 may be held by a person and thus move slowly or not at all. A second UE 130 may be integrated into a vehicle and/or may be transported by a vehicle and thus move rapidly. The first and second UEs 120, 130 may experience different channel characteristics. The first UE 120 may experience slow fading. If a source of interference, shadowing, etc. is present, it may remain so for an extended period of time. The second UE 130 may experience fast fading. Sources of interference may quickly enter and exit the range of the second UE 130. Because the UEs 120, 130 experience different channel conditions, different approaches may be needed to recover from poor channel conditions.

Figure 2:
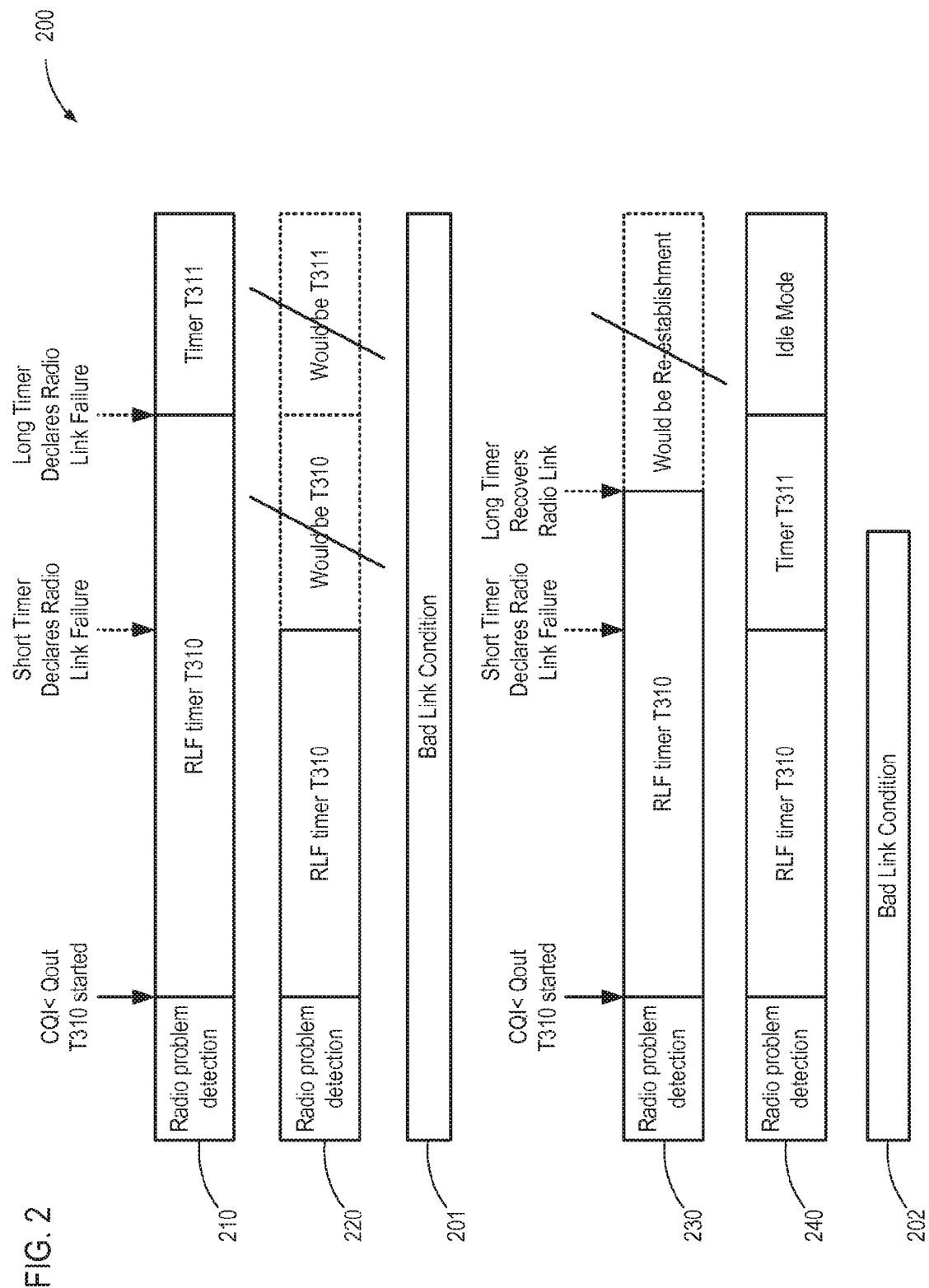
FIG. 2 is a schematic diagram of UE performance during a radio link failure for different RLF timer speeds.

FIG. 2 is a schematic diagram 200 of UE performance during a radio link failure for different RLF timer speeds. In an embodiment, the UE may detect that the CQI is less than the threshold Qout and generate an out-of-sync indication. Once N310 out-of-sync indications have been generated, the UE may start the T310 timer and attempt to recover the radio link. An in-sync indication may be generated if CQI is greater than the threshold Qin, and the T310 timer may reset if more than N311 in-sync indications are received. If the radio link is not recovered before the T310 timer expires (e.g., not more than N311 in-sync indications are received), a radio link failure may be declared. The UE may attempt to reestablish the connection and/or may enter idle mode once the radio link failure is declared.

A slowly moving UE may experience a bad link condition 201 that lasts for an extended period of time. The slowly moving UE may need to establish a connection with a new eNodeB to resolve the bad link condition 201. In a long RLF timer situation 210, the slowly moving UE may have to wait an extended period of time for the RLF timer to expire before it can establish the connection with the new eNodeB. In the short RLF timer situation 220, the slowly moving UE does not need to wait as long for the RLF timer to expire and may connect to the new eNodeB sooner. The UE will spend less time disconnected and provide a better user experience in the short RLF timer situation.

A rapidly moving UE may experience a bad link condition 202 that lasts for a brief period of time. The rapidly moving UE may be able to recover its connection with the current eNodeB if enough time is allowed for the bad link condition 202 to pass. In a long RLF timer situation 230, the rapidly moving UE may have sufficient time to recover the connection with the current eNodeB after the bad link condition 202 has passed. In a short RLF timer situation 240, the RLF timer may expire before the bad link condition 202 has passed and/or before the connection could be recovered. The UE will recover faster and provide a better user experience in the long RLF timer situation.

If the extended bad link condition 201 is the most likely kind of bad link condition to occur for the slowly moving UE and the brief bad link condition 202 is the most like kind to occur for the rapidly moving UE, the average performance of the UEs over time will be best when a short timer is used for slowly moving UEs and a long timer is used for rapidly moving UEs. For many UEs, their speed may change over time in an unpredictable manner. Accordingly, the speed of the UE may be measured to determine which link conditions it is likely to experience and thus how long the RLF timer should operate.

Figure 3A:
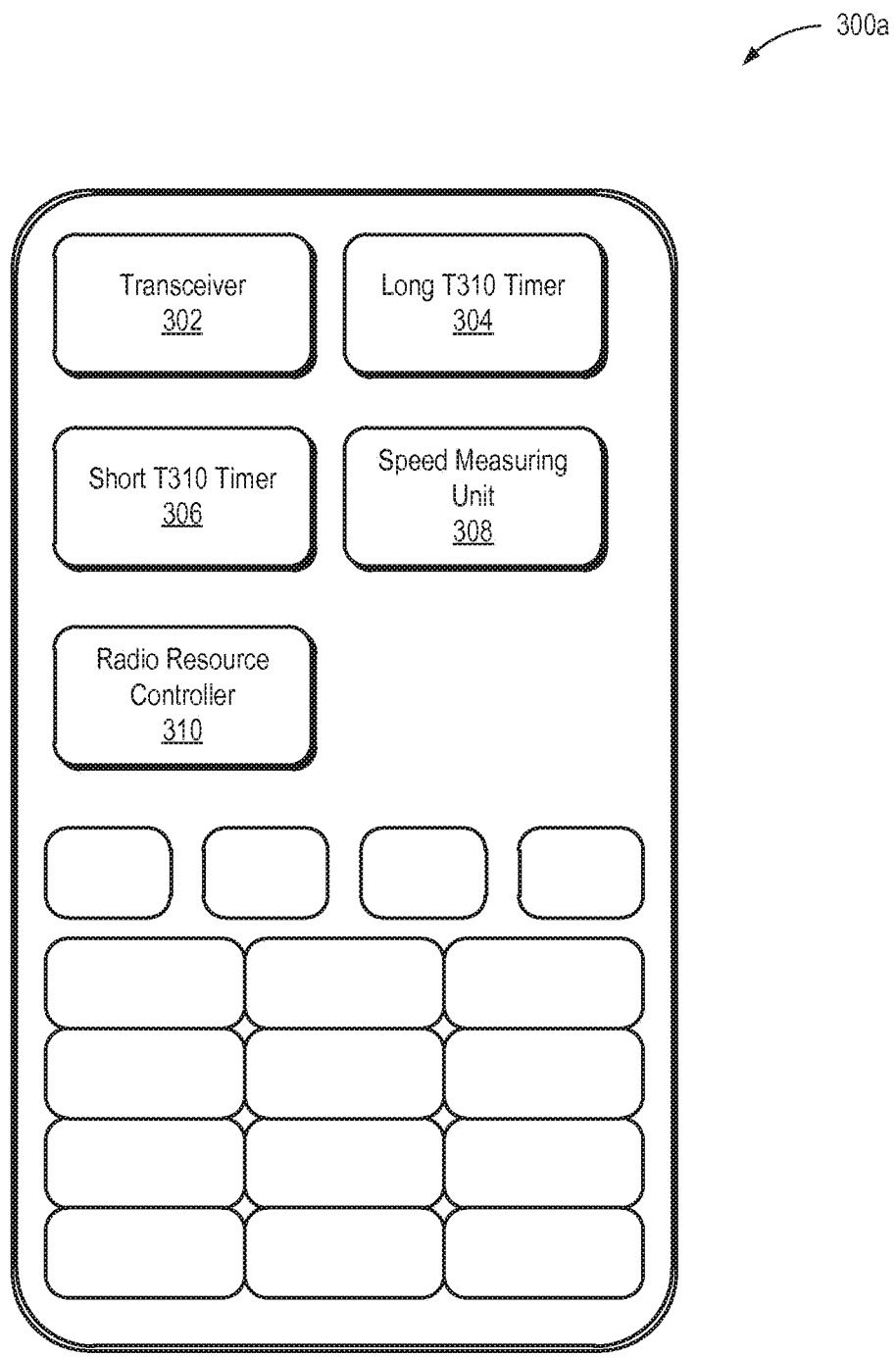
FIG. 3A is a schematic diagram of a UE configured to provide a plurality of different T310 timers based on UE speed.

FIG. 3A is a schematic diagram of an embodiment of a UE 300a configured to provide a plurality of different T310 timers based on UE speed. The UE 300a may include a transceiver 302 configured to communicatively couple the UE 300a to an eNodeB (not shown). The transceiver 302 may, inter alia, implement the physical layer and/or data link layer of the UE for communicating with the eNodeB. The UE 300a may further include a long T310 timer 304 and a short T310 timer 306. The timers 304, 306 may count up to a specified threshold and/or may count down from a specified starting point. The timers 304, 306 may expire when they reach the specified threshold and/or zero respectively. The run time of each timer 304, 306 may be dynamically adjustable, so the UE 300*a* may be able to change the run times depending on which eNodeB the UE 300*a* is connected to. For example, an urban eNodeB may expect different channel characteristics than a rural eNodeB, so the UE 300*a* may use different timer lengths for the different eNodeBs.

The UE 300*a* may further include a speed measuring unit 308. The speed measuring unit 308 may estimate how fast the UE 300*a* is travelling. The speed measuring unit 308 may determine speed based on a number, size, and/or location of cells traversed, based on a Doppler shift, based on a satellite navigation system, and/or the like. It is anticipated that further advances will be made in methods for estimating speed, and any such method may be used by the speed measuring unit 308 to determine speed. Any units may be used by the speed measuring unit 308 to express the speed, or the speed measuring unit 308 may classify the speed as belonging to one of a plurality of speed states. The speed states may be defined based on a set of thresholds, and the appropriate speed state may be determined by comparing the measured speed to the set of thresholds.

The UE 300*a* may include a radio resource controller 310, which may control RLF analysis and handovers between eNodeBs for the UE 300*a*. The radio resource controller 310 may transmit characteristics of the UE 300*a* to the eNodeB and may receive back parameters for the T310 timers 304, 306. The parameters may be communicated to the radio resource controller 310 in an RRC message. The radio resource controller 310 may parse the RRC message and may configure the T310 timers 304, 306 based on the received parameters. The radio resource controller 310 may receive the speed and/or speed state of the UE 300*a* from the speed measuring unit 308 and determine which T310 timer 304, 306 to use based on the received speed and/or speed state. The radio resource controller 310 may start one or both of the T310 timers 304, 306 when radio link problems are detected and may declare an RLF when the appropriate T310 timer 304, 306 expires. Although the transceiver 302, T310 timers 304, 306, speed measuring unit 308, and radio resource controller 310 are illustrated as separate units, the functionalities may be combined into fewer units and/or further separated into additional units in other embodiments.

Figure 3B:
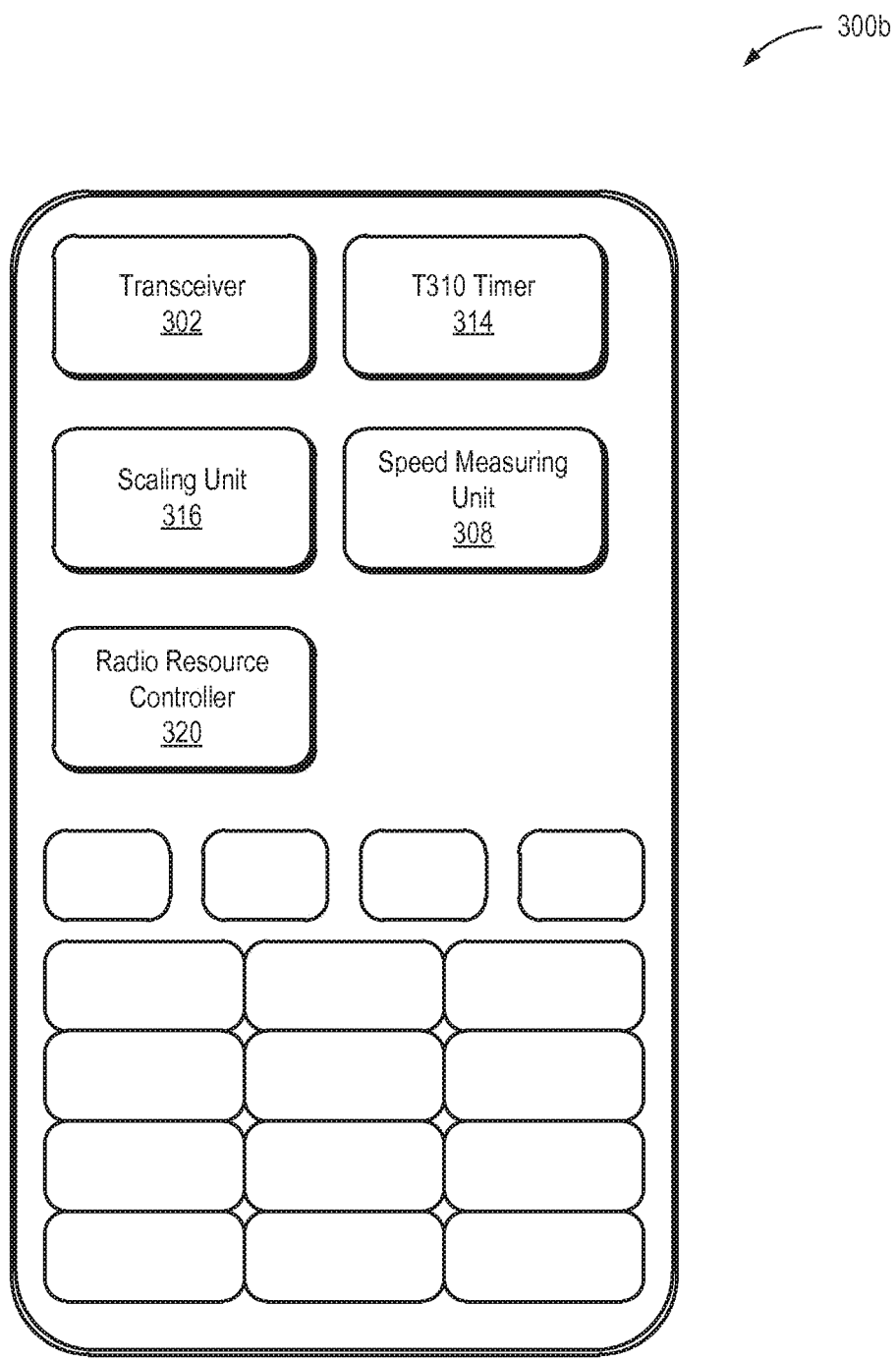
FIG. 3B is a schematic diagram of a UE configured to adjust a T310 timer speed based on UE speed.

FIG. 3B is a schematic diagram of an alternate embodiment of a UE 300*b* configured to adjust a T310 timer speed based on UE speed. The UE 300*b* may include a transceiver 302, which may be substantially similar to the transceiver 302 of the UE 300*a*. Additionally, the UEs 300*a*, 300*b* may speed measuring units 308 that are substantially similar to one another. Rather than having two T310 timers 304, 306, the UE 300*b* may include a single T310 timer 314. The T310 timer 314 may be adjusted by a scaling unit 316 to account for variations in speed of the UE 300*b*. The UE 300*b* may also include a radio resource controller 320. The radio resource controller 320 may be similar to the radio resource controller 310, but the radio resource controller 320 may control the T310 timer 314 and the scaling unit 316 rather than the two T310 timers 304, 306.

In response to sending characteristic information to the eNodeB, the radio resource controller 320 may receive scaling unit parameters for one or more speeds and/or speed states. In an embodiment, one speed state may use a default scaling, so only the other speed state(s) may need scaling unit parameters. The radio resource controller 320 may receive the speed and/or speed state from the speed measuring unit 308 and may instruct the scaling unit 316 to use a particular scaling factor based on the speed and/or speed state. The T310 timer 314 may count up to a specified threshold and/or count down from a specified starting point. The scaling unit 316 may be configured based on the design of the T310 timer 314. The scaling factor may be multiplied by the specified threshold, the specified starting point, the current count of the T310 timer 312, and/or the like. The radio resource controller 320 may determine when the scaled T310 timer has expired and may declare an RLF when the scaled T310 timer has expired. Although the transceiver 302, T310 timer 314, scaling unit 316, speed measuring unit 308, and radio resource controller 320 are illustrated as separate units, the functionalities may be combined into fewer units and/or further separated into additional units in other embodiments.

Figure 4:
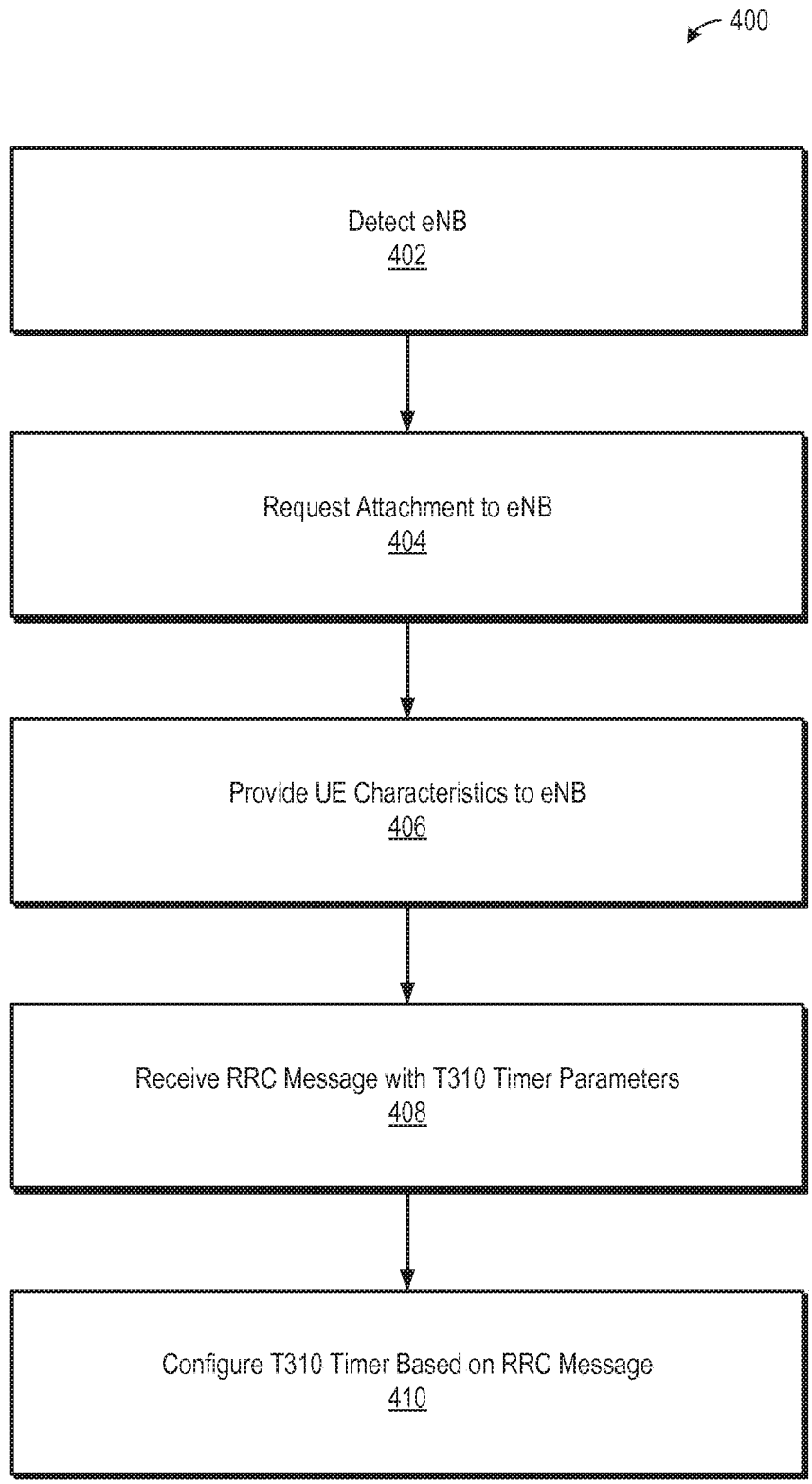
FIG. 4 is a flow diagram of a method for receiving information on T310 timer speeds.

FIG. 4 is a flow diagram of a method 400 for receiving information on T310 timer speeds. The method 400 may begin with an eNodeB being detected 402, for example, by a UE. The eNodeB may be detected as a result of the UE first being turned on, as a part of a normal handoff procedure, and/or the like. The UE may request 404 attachment to the detected eNodeB. For example, the UE may transmit a connection request to the detected eNodeB, and/or a handover request may be sent on the UE's behalf.

During and/or after attachment, characteristics of the UE may be provided 406 to the eNodeB. For example, identifying information for the UE (e.g., a manufacturer of the UE, a model of the UE, etc.), settings of the UE, a manufacturer of a transceiver, a model of the transceiver, settings of the transceiver, an initial speed of the UE, and/or the like may be provided to the eNodeB. The eNodeB may request the information it wants, and/or a predetermined set of information may be provided to the eNodeB. Based on the provided information about the UE and/or already known information about the eNodeB, the eNodeB may determine T310 timer parameters. An RRC message containing the T310 timer parameters may be received 408 from the eNodeB. For example, the RRC message may be a connection reconfiguration message. Depending on the embodiment and/or configuration, the T310 parameters may include run times for a short timer and a long timer, scaling factors for different speeds, and/or the like. The T310 timer parameters may include speed divisions and/or definitions of speed states that indicate which timer and/or scaling factor should be used for each UE speed.

The T310 timer may be configured 410 based on the T310 timer parameters received in the RRC message. Configuring 410 the T310 timer parameters may include configuring the T310 timer to operate using the parameters for the current UE speed. The UE speed may be continually monitored, and the parameters may be updated as the UE speed changes. Alternatively, or in addition, the T310 timer may be configured with all the received parameters, and the particular parameters to be used may be determined based on the UE speed when the T310 timer is needed.

Figure 5:
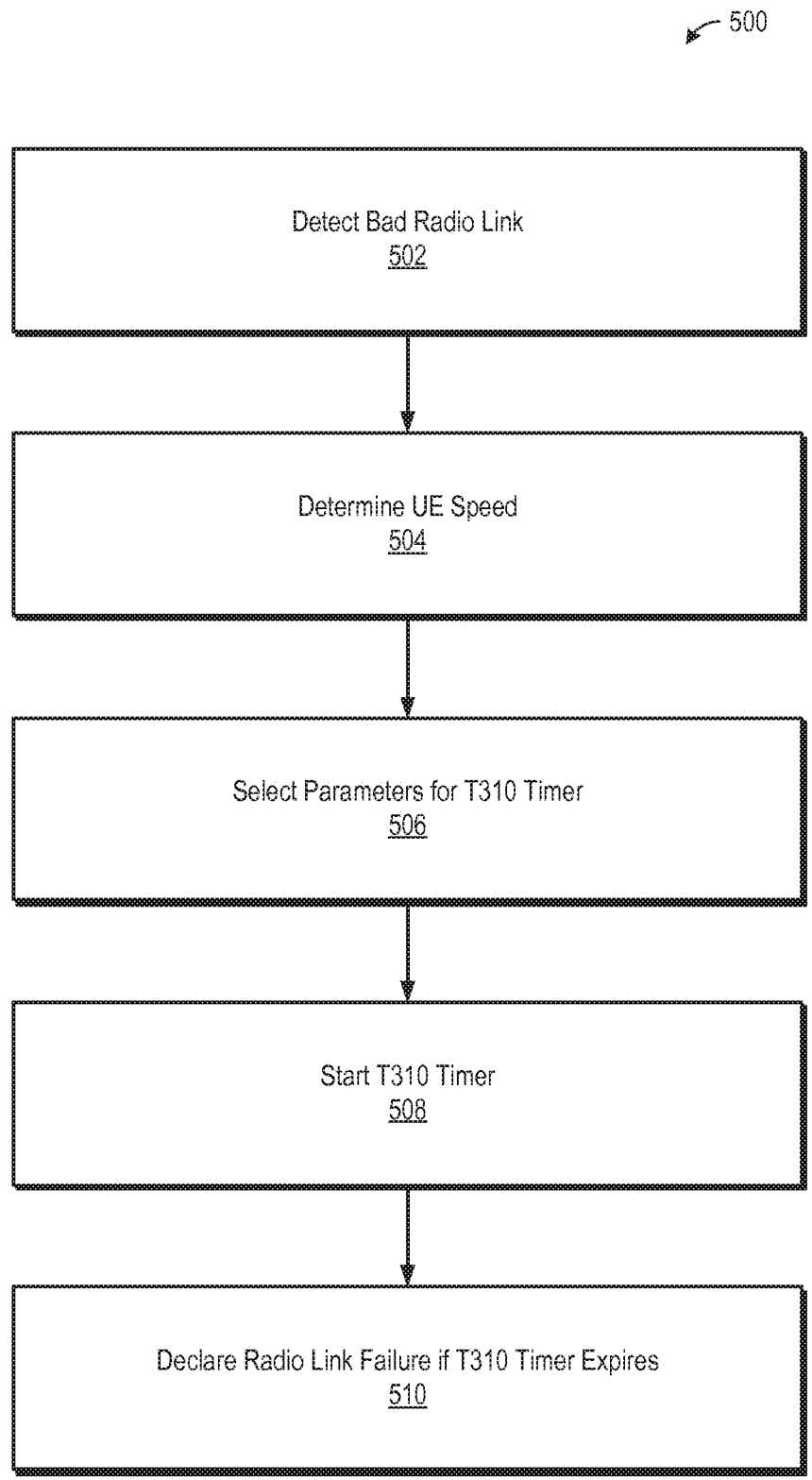
FIG. 5 is a flow diagram of a method for determining whether to declare a radio link failure.

FIG. 5 is a flow diagram of a method 500 for determining whether to declare a radio link failure. The method 500 may begin when a bad radio link is detected 502. Detecting 502 the bad radio link may include determining whether the CQI is less than a threshold Qout and generating an out-of-sync indication. Detecting 502 the bad radio link may further include determining that more than a specified number of out-of-sync indications have been generated (e.g., more than a number N310 specified by an eNodeB). If more than the specified number of out-of-sync indications have been generated, it may be determined that the radio link is bad. Otherwise, the CQI may continue to be monitored.

In an embodiment, the UE speed may be determined 504 in response to the bad radio link being detected 502. Alternatively, or in addition, the UE speed may have previously determined and may not need to be determined again. Determining 504 the UE speed may include retrieving a continually updated UE speed. The UE speed may be in any of various units, and/or the UE speed may be specified as a speed state. For example, one embodiment may include UE speed states of fast and slow, and another embodiment may include UE speed states of fast, medium, and slow. The speeds corresponding to each speed state may be specified by the eNodeB, predetermined, defined by a standard, and/or the like. The parameters for the T310 timer may be selected 506 based on the UE speed determined 504. Selecting 506 the parameters may include determining which of a plurality of T310 timers to use, determining a scaling factor for the T310 timer, determining a run time for the T310 timer, and/or the like. In some embodiments, the parameters for the T310 timer may have been determined previously, for example, when a UE speed was previously measured. In such embodiments, the T310 timer parameters may not need to be selected 506 again.

Once the T310 timer parameters have been selected and the T310 timer has been configured, the T310 timer may be started 508. The T310 timer may count down from a specified starting point, may count up to a specified threshold, and/or the like. The T310 timer may continue to operate as long as fewer than a specified number of in-sync indications have been received. For example, an in-sync indication may be generated each time the CQI is greater than a threshold Qin. If more than the specified number of in-sync indications are received, then it may be assumed that the radio link has recovered. The T310 timer may be stopped and reset until the next bad radio link is detected 502. If the radio link is not recovered, the T310 timer may run until it expires. The T310 timer may expire by counting down to zero or by counting up to the specified threshold. A radio link failure may be declared 510 if the T310 timer expires. In response to the radio link failure, the UE may attempt to reestablish a connection with the eNodeB and/or may go to idle mode and start the connection process over again.

Figure 6:
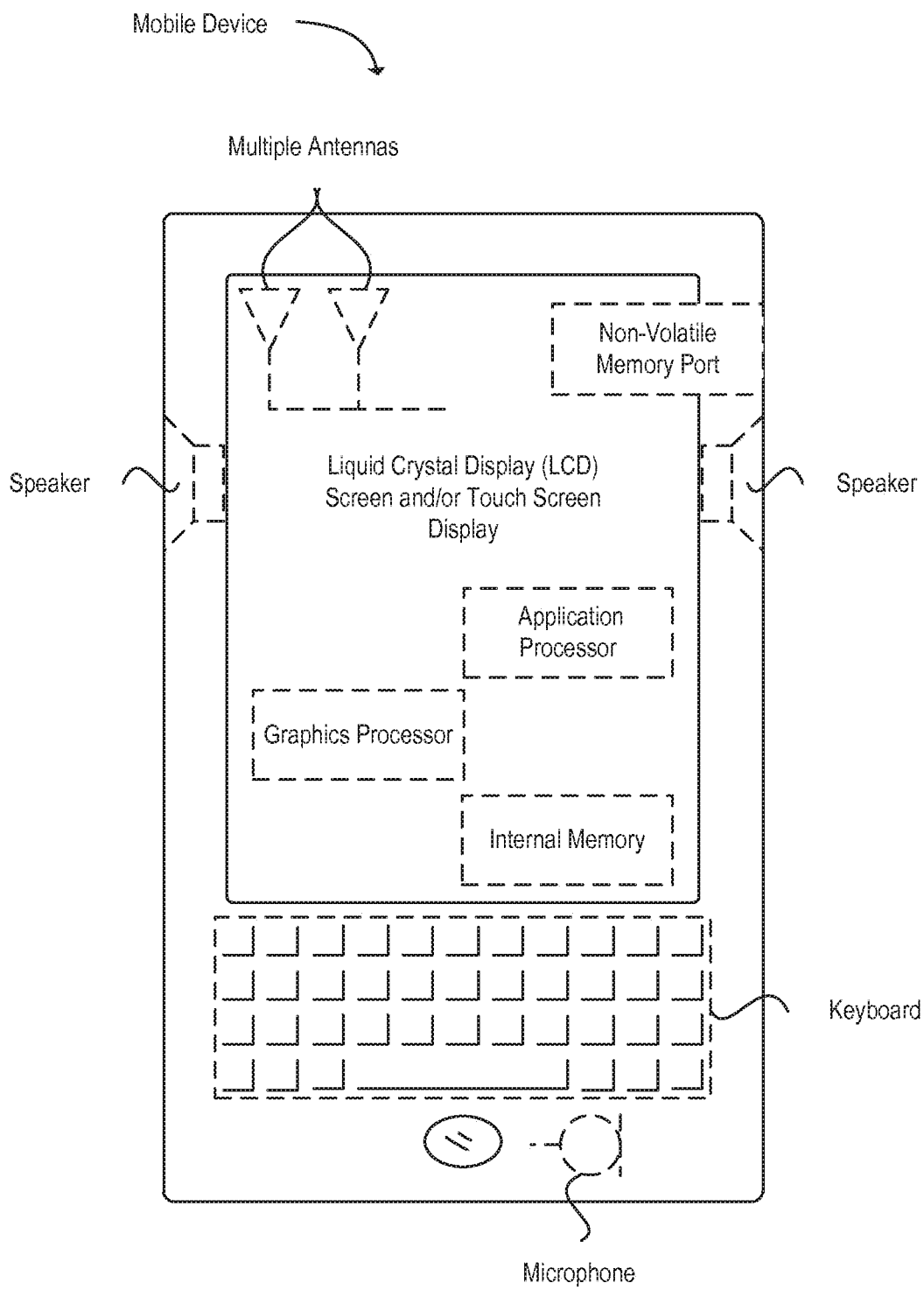
FIG. 6 is a schematic diagram of a UE able to support modified T310 timers.

FIG. 6 is an example illustration of a mobile device, such as a user equipment (UE), a mobile station (MS), a mobile wireless device, a mobile communication device, a tablet, a handset, or another type of wireless communication device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, high speed packet access (HSPA), Bluetooth, and Wi-Fi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 6 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

EXAMPLES

The following examples pertain to further embodiments:

Example 1 is a UE configured to communicate with an eUTRAN. The UE includes a transceiver and a processor coupled to the transceiver. The processor is configured to receive a unicast message from the eUTRAN. The message includes parameters for a T310 timer and indicates which parameters to use for different UE speeds. The processor is also configured to determine a radio link with the eUTRAN has a quality below a predetermined threshold. The processor is also configured to determine a current speed of the UE. The processor is also configured to configure the T310 timer with the parameters for the current speed of the UE. The processor is also configured to start the T310 timer. The processor is also configured to declare a radio link failure when the T310 timer expires In Example 2, the parameters for the T310 timer of Example 1 include a scaling factor. The T310 timer is multiplied by the scaling factor to adjust a running time of the T310 timer.

In Example 3, the scaling factor of any of Examples 1-2 causes the T310 timer to take less time to expire when the current speed of the UE is less than a predetermined threshold.

In Example 4, the parameters for the T310 timer of any of Examples 1-3 include which of a short T310 timer and a long T310 timer to use as the T310 timer.

In Example 5, the processor of any of Examples 1-4 is configured to start the short timer when the current speed of the UE is less than a predetermined threshold.

In Example 6, the processor of any of Examples 1-5 is configured to determine the radio link is bad by generating a predetermined number of out-of-sync indications.

In Example 7, the UE of any of Examples 1-6 receives the indications of which T310 timer parameters to use in an RRC message.

In Example 8, the UE of any of Examples 1-7, includes a transceiver including transmitter and receiver components, multiple antennas, in which a first antenna of the multiple antennas is coupled to the transmitter, and in which a second antenna of the multiple antennas is coupled to the receiver, a display touchscreen, and a keyboard.

Example 9 is a method for adjusting a time until a radio link failure is declared. The method includes receiving configuration information from a base station in a one-to-one message. The method also includes determining a speed of a mobile user device. The method also includes configuring a radio link failure timer based on the speed of the mobile user device and the configuration information. The radio link failure timer is longer when the mobile user device is moving at a high speed than it is when the mobile user device is moving at a low speed.

In Example 10, the method of Example 9 includes detecting a radio link quality below a predetermined threshold. The method also includes starting the radio link failure timer in response to detecting the radio link quality below the predetermined threshold. The method also includes declaring a radio link failure when the radio link failure timer expires.

In Example 11, the configuring of the radio link failure timer of any of Examples 9-10 includes determining which of a long timer and a short timer to use as the radio link failure timer.

In Example 12, the configuring of the radio link failure timer of any of Examples 9-11 includes selecting a scaling factor to adjust a run time of the radio link failure timer.

In Example 13, the determining the speed of the mobile user device of any of Examples 9-12 includes classifying the mobile user device into one of a plurality of states based on the speed of the mobile user device.

In Example 14, the receiving of configuration information of any of Examples 9-13 includes receiving configuration information associated with one or more of the plurality of states.

In Example 15, the method of any of Examples 9-14 includes transmitting indications of characteristics of the mobile user device to the base station. The configuration information is determined by the base station based on the indications of the characteristics.

Example 16 is a device for adjusting a time until a radio link failure is declared. The device includes circuitry. The circuitry is configured to access settings for a recovery timer for each of a plurality of speed states of the device. The settings were indicated in a reconfiguration message from a based station. The circuitry is also configured to determine a current speed state of the device. The circuitry is also configured to, upon detecting a decline in signal quality, start the recovery timer according to the settings for the current speed state.

In Example 17, the circuitry of Example 16 is further configured to switch to an idle mode in response to the recovery timer expiring.

In Example 18, the settings for the recovery timer of any of Examples 16-17 include a scaling factor for the recovery timer for each of the plurality of speed states.

In Example 19, the scaling factor of any of Examples 16-18 decreases a running time of the recovery timer when the current speed state is a low speed state.

In Example 20, the settings for the recovery timer of any of Examples 16-19 include a running time for a short timer used in a low speed state and a running time for a long timer used in a high speed state.

In Example 21, the circuitry of any of Examples 16-20 is configured to start the short timer and the long timer upon detecting the decline in signal quality. The local transceiver is configured to determine, based on the current speed state, which of an expiration of the short time and an expiration of long timer should cause the local transceiver to declare a radio link failure.

In Example 22, the circuitry of any of Examples 16-21 is configured to provide identifying information to the base station. The settings are selected by the base station based on the identifying information.

Example 23 is a method for adjusting a time until a radio link failure is declared when communicating with an eUTRAN. The method includes receiving, at a UE, a one-to-one message from an eNB. The message also includes parameters for a T310 timer and indicates which parameters to use for different UE speeds. The method also includes determining a radio link with the eNB has a quality below a predetermined threshold. The method also includes determining a current speed of the UE. The method also includes configuring the T310 timer with the parameters for the current speed of the UE. The method also includes starting the T310 timer. The method also includes declaring a radio link failure when the T310 timer expires.

In Example 24, the parameters for the T310 timer of Example 23 include a scaling factor. Configuring the T310 timer includes multiplying the T310 timer by the scaling factor to adjust a running time of the T310 timer.

In Example 25, the scaling factor of any of Examples 23-24 causes the T310 timer to take less time to expire when the current speed of the UE is less than a predetermined threshold.

In Example 26, the parameters for the T310 timer of any of Examples 23-25 include a running time of a short timer and a running time of a long timer. Configuring the T310 timer includes determining which of the long timer and the short timer to use as the T310 timer.

In Example, 27, the determining of which of the long timer and the short timer to use of any of Examples 23-26 includes using the short timer when the speed of the UE is less than a predetermined threshold.

In Example 28, the determining that the radio link with the eNB has the quality below the predetermined threshold of any of Examples 23-27 includes generating a predetermined number of out-of-sync indications.

In Example 29, the receiving the one-to-one message of any of Example 23-28 includes receiving an RRC message.

In Example 30, the determining of the current speed of the UE of any of Examples 23-29 includes classifying UE into one of a plurality of states based on the speed of the UE.

In Example 31, the receiving of the one-to-one message including the parameters for the T310 timer of any of Examples 23-30 includes receiving parameters associated with one or more of the plurality of states.

In Example 32, the method of any of Examples 23-31 includes transmitting indications of characteristics of the UE to the eNB. The parameters for the T310 timer are determined by the eNB based on the indications of the characteristics.

In Example 33, the transmitting the indications of the characteristics of the UE of any of Examples 23-32 includes providing identifying information to the eNB. The eNB selects the parameters for the T310 timer based on the identifying information.

In Example 34, the method of any of Examples 23-33 includes switching to an idle mode in response to the T310 timer expiring.

In Example 35, the starting of the T310 timer of any of Examples 23-34 includes starting the short timer and the long timer upon determining the radio link has the quality below the predetermined threshold. Configuring the T310 timer includes determining, based on the current state, which of an expiration of the short time and an expiration of long timer should cause the local transceiver to declare a radio link failure.

Example 36 is an apparatus including means to perform a method as described in any preceding example.

Example 37 is machine readable storage including machine-readable instructions, which when executed, implement a method or realize an apparatus as described in any preceding example.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium, wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

Those having skill in the art will appreciate that many changes may be made to the details of the above-described embodiments without departing from the underlying principles of the disclosure. The scope of the present application should, therefore, be determined only by the following claims.

The invention claimed is:

1. At least one non-transitory computer readable storage medium having stored thereon instructions that, when executed by a computing device, cause the computing device to perform a method, the method comprising:
receiving configuration information from a base station in a one-to-one message;
configuring a set of radio link failure timers based on a set of speeds of the mobile user device indicated by the configuration information,
wherein a radio link failure timer is set for longer when the mobile user device is moving at a high speed than it is when the mobile user device is moving at a low speed;
detecting a radio link quality below a predetermined threshold;
starting the set of radio link failure timers in response to detecting the radio link quality below the predetermined threshold;
after starting the set of radio link failure timers, determining a speed of the mobile user device;
selecting a timer from the set of radio link failure timers based on the current speed of the mobile user device; and
declaring a radio link failure when the radio link failure timer expires.

2. The computer readable storage medium of claim 1, wherein configuring the set of radio link failure timers comprises a long timer and a short timer.

3. The computer readable storage medium of claim 1, wherein configuring the radio link failure timer comprises selecting a scaling factor to adjust a run time of the set of radio link failure timers.

4. The computer readable storage medium of claim 1, wherein determining the speed of the mobile user device comprises classifying the mobile user device into one of a plurality of states based on the speed of the mobile user device.

5. The computer readable storage medium of claim 4, wherein receiving configuration information comprises receiving configuration information associated with one or more of the plurality of states.

6. The computer readable storage medium of claim 5, further comprising transmitting indications of characteristics of the mobile user device to the base station, wherein the configuration information is determined by the base station based on the indications of the characteristics.

7. At least one non-transitory computer readable storage medium having stored thereon instructions that, when executed by a computing device, cause the computing device to perform a method, the method comprising:
configuring a set of radio link failure timers based on a set of speeds of the mobile user device indicated by the configuration information,
wherein a radio link failure timer is set for longer when the mobile user device is moving at a high speed than it is when the mobile user device is moving at a low speed;
starting the set of radio link failure timers based at least in part on the radio link quality below a predetermined threshold;
after starting the set of radio link failure timers, selecting a timer from the set of radio link failure timers based on the current speed of the mobile user device.

8. The computer readable storage medium of claim 7, wherein the method further comprises declaring a radio link failure when the selected timer expires.

9. An apparatus of a user equipment (UE) configured to determine radio link failure, the apparatus comprising:
a transceiver; and
a processor coupled to the transceiver, the processor configured to:
receive parameters for a set of timers and indicating which parameters to use for different UE speeds;
determine a radio link has a quality below a predetermined threshold;
configure the set of timers with the parameters for the different UE speeds, wherein the timer is set for longer when the UE is moving at a high speed than it is when the UE is moving at a low speed;
start the set of timers;
after starting the set of timers, determine a current speed of the UE;
select a timer from the set of timers based on the current speed of the UE; and
declare a radio link failure when the selected timer expires.

10. The apparatus of claim 9, wherein the scaling factor causes the-set of timers to take less time to expire when the current speed of the UE is less than a predetermined threshold.

11. The apparatus of claim 9, wherein the parameters for the set of timers include a short-timer and a long timer.

12. The apparatus of claim 11, wherein the processor is configured to select the short timer when the current speed of the UE is less than a predetermined threshold.

13. The apparatus of claim 9, wherein the processor is configured to determine the radio link is bad by generating a predetermined number of out-of-sync indications.

14. The apparatus of claim 9, wherein the transceiver is configured to communicate with an evolved universal terrestrial radio access network (eUTRAN).

15. The apparatus of claim 9, wherein the parameters for the set of timers include a scaling factor, and wherein the-set of timers is multiplied by the scaling factor to adjust a running time of the set of timers.

\* \* \* \* \*